(12) United States Patent
Young et al.

(10) Patent No.: US 11,265,933 B2
(45) Date of Patent: Mar. 1, 2022

(54) TELEMATICS DEVICE FOR COMMUNICATING AND COLLECTING AGRICULTURAL DATA

(71) Applicant: Farmers Edge Inc., Winnipeg (CA)

(72) Inventors: Keith Alan Young, Edmonton (CA); Ronald W. Osborne, Jr., Omaha, NE (US)

(73) Assignee: Farmers Edge Inc., Winnipeg (CA)

( * ) Notice: Subject to any disclaimer, the term of this patent is extended or adjusted under 35 U.S.C. 154(b) by 44 days.

(21) Appl. No.: 16/843,518

(22) Filed: Apr. 8, 2020

(65) Prior Publication Data
US 2020/0337094 A1 Oct. 22, 2020

Related U.S. Application Data

(60) Provisional application No. 62/835,971, filed on Apr. 18, 2019.

(51) Int. Cl.
*H04W 4/00* (2018.01)
*H04W 76/10* (2018.01)
*H04W 74/00* (2009.01)
*H04W 4/40* (2018.01)
*G05D 1/00* (2006.01)
*H04B 17/318* (2015.01)

(52) U.S. Cl.
CPC .......... *H04W 76/10* (2018.02); *G05D 1/0022* (2013.01); *H04B 17/318* (2015.01); *H04W 4/40* (2018.02); *H04W 74/002* (2013.01); *G05D 2201/0201* (2013.01)

(58) Field of Classification Search
CPC ...................... H04W 52/0229; H04W 52/0235
See application file for complete search history.

(56) References Cited

U.S. PATENT DOCUMENTS

| | | | |
|---|---|---|---|
| 2002/0115436 A1 | 8/2002 | Howell et al. | |
| 2017/0046639 A1 | 2/2017 | Osborne et al. | |
| 2017/0339095 A1* | 11/2017 | Lei | H04L 41/12 |
| 2018/0020392 A1 | 1/2018 | Eller | |
| 2018/0024549 A1* | 1/2018 | Hurd | G05D 1/0016 701/2 |
| 2018/0279066 A1 | 9/2018 | Dollinger et al. | |
| 2019/0380311 A1* | 12/2019 | Crouthamel | A01K 29/005 |
| 2020/0125929 A1* | 4/2020 | Guo | G06N 3/084 |

FOREIGN PATENT DOCUMENTS

WO 201928269 2/2019

* cited by examiner

*Primary Examiner* — Khalid W Shaheed
(74) *Attorney, Agent, or Firm* — Ryan W. Dupuis; Kyle R. Satterthwaite; Ade & Company Inc.

(57) ABSTRACT

A telematics device associated with an agricultural vehicle for communicating and collecting agricultural data is provided. The telematics device includes a telematic device housing, a processor disposed within the telematic device housing, the processor coupled to a wireless transceiver for providing wireless connectivity for communicating the agricultural data and an interface coupled to the processor for receiving the agricultural data from at least one of the agricultural vehicle and an implement towed by the agricultural vehicle. The processor is configured to determine a measure of the wireless connectivity associated with the wireless transceiver and adjust a data transfer rate up or down based on the measure of the wireless connectivity.

18 Claims, 7 Drawing Sheets

TELEMATICS DEVICE FOR COMMUNICATING AND COLLECTING AGRICULTURAL DATA

RELATED APPLICATIONS

This application claims priority to U.S. Provisional Patent Application No. 62/835,971, filed Apr. 18, 2019, hereby incorporated by reference in its entirety.

BACKGROUND

Field of Art

The disclosure relates generally to methods and systems for collecting agriculture data for use in agriculture and farming decision making, and more specifically, to a telematics device and method of adjusting the rate and type of agriculture data recorded, the type of agriculture data saved to the telematics device on-board memory, and the frequency and type of data wirelessly transmitted to a network.

Description of the Related Art

Related art systems attempt to utilize telematic systems or techniques when recording agricultural crop production to improve the efficiency and productivity of agricultural vehicles deployed in an area (e.g., a field or a farm). Such systems require management of agricultural data, for example agricultural crop yield, based on the location and operating status of a vehicle, especially in implementations involving large or intensive crop production farms. In some related art implementations, agricultural data is managed using multiple components including, 1) a telematics device configured to communicate data recorded by an agricultural vehicle and access receive data recorded by other agricultural vehicles, and 2) software which allows the device to communicate or access a fleet of mobile vehicles.

However, the related art systems are unable to account for data loss when attempting to transmit data at a time when the device has poor wireless connectivity. Accordingly, operators of agricultural vehicles are unable to make decisions in real-time based on real-time, accurate data describing the field in scenarios where some data cannot be transferred due to poor connectivity. Therefore, there exists a need for a telematics device capable of providing real-time, accurate data to or from an agricultural vehicle regardless of the available wireless connectivity.

Additionally, agricultural vehicles or attached implements are typically deployed seasonally, resulting in extensive periods, or "off-seasons" during which the telematics device is often placed into a hibernate mode. Existing systems cannot receive update messages while in a hibernate mode, as the hibernate mode disables the ability to receive and react to such messages until manually powered back on.

SUMMARY

Described herein is an agricultural data collection and transfer system comprising a telematics device configured to address several technical challenges. The telematics device may be configured to perform one or more of the following tasks: 1) adjust a data transfer rate up or down according to a measure of wireless connectivity, 2) determine a quality of service specific to the type of agricultural vehicle, and 3) implement an out-of-band management capability for uploading files in a battery preservation state.

Regarding the first consideration, varying connectivity for live data transfer may be experienced in precision agriculture systems. For example, remote fields may have poor wireless communication and hills within fields can create intermittent wireless availability. Agriculture vehicles deployed in an environment with a wireless connection above a threshold level of connectivity may receive live data in real-time as the data is recorded, compared to vehicles in environments with a below threshold level of connectivity. In the latter implementations, the telematics device may reduce the rate of data transfer by prioritizing certain types of data or data packets.

To prioritize data based on the type of agricultural vehicle, a telematics device may perform real-time adjustments to the rate of data transfer based on a quality of service for the vehicle or its implements. Quality of service describes or identifies data which should be communicated to a telematics device before other types of data to allow operators to make real-time decisions for specific vehicles or implements. Examples of data which may prioritized in a quality of service analysis include, but are not limited to, real-time kinematic (RTK) positioning and diagnostic trouble codes (DTC) which may take precedence over other data coming from the field through the telematics device.

To preserve the vehicle battery during off-seasons or periods during which the vehicle is not deployed to gather agricultural data, the collection or transfer system implements a power management solution using out-of-band management techniques. In one embodiment, the device monitors voltage of the battery which powers the vehicle to ensure that the battery is not completely depleted. The vehicle may be remotely activated from a hibernating state by an out-of-band management SMS messages or, alternatively, a timer. The vehicle or telematics device may be released from hibernation, updated, or sent data files, and, subsequently, returned to hibernation mode.

In some embodiments, operators of vehicles deployed in an environment with a wireless connection above a threshold level of connectivity (or defined differently, a strong) wireless connection may have live data transferred via the telematics device at the rate at which it is collected by the agricultural vehicle, other communicatively coupled agricultural vehicles, or a combination thereof.

Alternatively, operators in an environment with a wireless connection below a threshold level of connectivity (or defined differently, a weak) wireless connection may reduce the rate of live data transfer by prioritizing certain types of data or data packets to ensure that the most relevant data is transferred first. In such implementations, all data may be transferred via telematics device over a longer duration of time. Alternatively, the data or data packets that were not prioritized are stored on the telematics device until the wireless connectivity improves. In other scenarios, subject to the quality of service, the data packets may be deleted entirely from the device; subject to available memory of the device, if the cell signal is poor and not improving, the device might be sitting on massive amounts of data that will never get sent. In that case, there is a need to be able to delete data so that onboard storage is not depleted.

The telematics device, for example a relay telematics device, may employ an interface which queries a wireless model communicatively coupled to the telematics devices to query for specific parameters that establish current connection quality. In such embodiments, the data transfer system may perform a real-time calculation to predict the quality of live data transfer in different areas of a field and communicate the results of that calculation to an operator.

According to one aspect, a telematics device associated with an agricultural vehicle for communicating and collecting agricultural data is provided. The telematics device includes a telematic device housing, a processor disposed within the telematic device housing, the processor coupled to a wireless transceiver for providing wireless connectivity for communicating the agricultural data and an interface coupled to the processor for receiving the agricultural data from at least one of the agricultural vehicle and an implement towed by the agricultural vehicles. The processor is configured to determine a measure of the wireless connectivity associated with the wireless transceiver and adjust a data transfer rate up or down based on the measure of the wireless connectivity. The measure of the wireless connectivity may include at least one of wireless signal strength and a wireless signal quality. The telematics device may be configured to query a wireless model communicatively coupled to the telematics device for parameters that establish the measure of the wireless connectivity. The processor may be further configured to identify at least a first type of the agricultural data and at least a second type of the agricultural data wherein the first type of the agricultural data is prioritized for communication with the wireless transceiver if the measure of the wireless connectivity is below a threshold level of connectivity. The first type of the agricultural data is associated with a type of the agricultural vehicle, the type of the agricultural vehicle having a quality of service associated therewith. The agricultural data may include equipment data and operation data. The telematics device may have an active state and a hibernating state and wherein the telematics device provides remote activation from the hibernating state to the active state. The remote activation may be provided using an out-of-band management SMS message. The operational state may allow for updating of at least one of firmware or configuration settings for the telematics device and prescription information. The telematics device may have an active state and a hibernating state and wherein the telematics device includes a timer configured to periodically transition the telematics device from the hibernating state to the active state. The processor may provide for data management to determine recording of data, uploading of data to a network or device, frequency of uploading of data to the network or device, frequency of downloading of data from the network or device, and deletion of data based on the measure of the wireless connectivity and amount of available memory storage.

According to another aspect a method performed with the telematics device may provide for receiving the agricultural data from the agricultural vehicle or the implement towed by the agricultural vehicle, determining the measure of the wireless connectivity associated with the wireless transceiver, and adjusting the data transfer rate up or down based on the measure of the wireless connectivity. The agricultural data may include equipment data and operation data. The method may further include identifying, using the processor, at least a first type of the agricultural data and at least a second type of the agricultural data wherein the first type of the agricultural data is prioritized for communication with the wireless transceiver if the measure of the wireless connectivity is below a threshold level of connectivity.

According to another aspect, a telematics device associated with an agricultural vehicle for communicating and collecting agricultural data, includes a telematic device housing, a processor disposed within the telematic device housing, the processor coupled to a wireless transceiver for providing wireless connectivity for communicating the agricultural data, an interface coupled to the processor for receiving the agricultural data from the agricultural vehicle, or an implement towed by the agricultural vehicle, and a memory operatively connected to the processor for storing the agricultural data from the agricultural vehicle or the implement towed by the agricultural vehicle. The processor provides for data management to determine recording of the agricultural data to the memory, uploading of the agricultural data to a network or device, frequency of uploading of the agricultural data to the network or device, frequency of downloading of data from the network or device, and deletion of data based on a measure of wireless connectivity and an amount of available memory storage.

According to another aspect, a telematics device associated with an agricultural vehicle for communicating and collecting agricultural data, the telematics device is provided. The method includes a telematic device housing a processor disposed within the telematic device housing, the processor coupled to a wireless transceiver for providing wireless connectivity for communicating the agricultural data, an interface coupled to the processor for receiving the agricultural data from the agricultural vehicle, or an implement towed by the agricultural vehicle, and a memory operatively connected to the processor for storing the agricultural data from the agricultural vehicle or the implement towed by the agricultural vehicle. The may be configured to determine a measure of the wireless connectivity associated with the wireless transceiver. The may be further configured to identify at least a first type of the agricultural data and at least a second type of the agricultural data wherein the first type of the agricultural data is prioritized for communication with the wireless transceiver if the measure of the wireless connectivity is below a threshold level of connectivity.

The need for this technology arose from experience of users with deployment of telematics systems. Finite memory and finite bandwidth have proven to be challenging and complex issues. The telematics device outlined in this application can be utilized, on farm and off road, by equipment manufacturers, municipal governments, agronomists, and growers. Optimum data from the machinery would be received by the user, based on the rules in a data management configuration. The highest value data would be transferred and received through a user interface such as a chart, report table, or alert, which would allow the user to make superior precision farming decisions.

The figures depict various embodiments of the disclosure for purposes of illustration only. One skilled in the art will readily recognize from the following discussion that alternative embodiments of the structures and methods illustrated herein may be employed without departing from the principles described herein.

DETAILED DESCRIPTION

I. System Architecture

Figure 1:
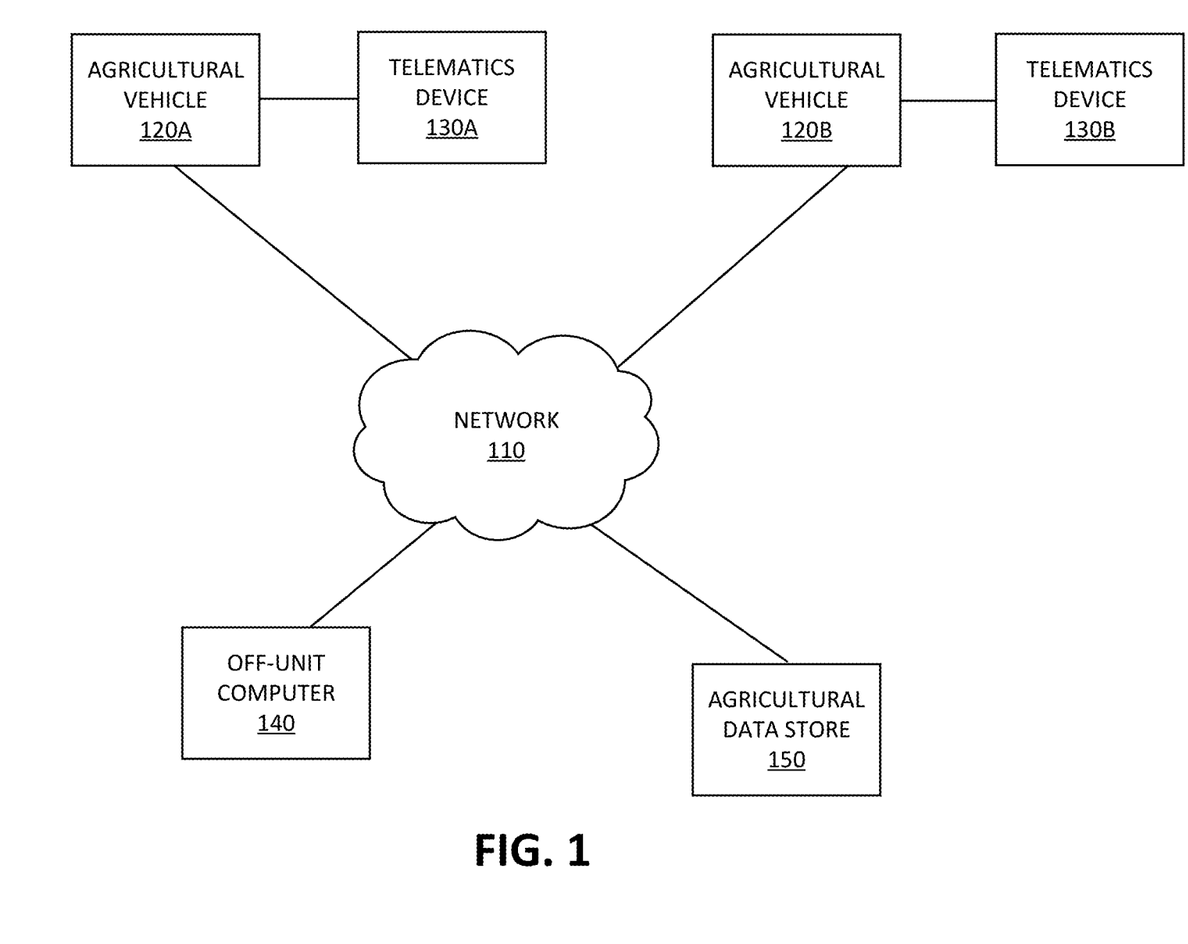
FIG. 1 is a high-level block diagram of a system environment, according to an embodiment.

FIG. 1 is a high-level block diagram of a system environment, according to an embodiment. In the embodiment shown by FIG. 1, the system environment comprises a network 110, multiple agricultural vehicles 120 (120a, 120b, etc.), multiple telematics devices 130 (130a, 130b, etc.) each of which is associated with a different agricultural vehicle, an off-unit computer 140, and an agricultural data store 150. However, in other embodiments, the system environment 100 may include different and/or additional components.

The agricultural vehicle 120 is an item of heavy equipment designed to navigate through a field to perform record data about crops or plants in the field, for example plant yield data, treatment data, or field conditions data. Examples of agricultural vehicles 120 include, but are not limited to, combine harvesters, tractors, sugar cane harvesters, and sprayers for the application of fertilizer, herbicide, and pesticide. In the illustrated embodiment of FIG. 1, the system includes two agricultural vehicles (i.e., 120a and 120b), however the system may include any number of additional agricultural vehicles 120 deployed to perform the same or different tasks within a field.

Each agricultural vehicle is coupled to a telematics device 130 which communicatively couples an individual agricultural vehicle to a store of data collected by other agricultural vehicles of the fleet, for example agricultural data store 150. Each telematics device 130 is installed (i.e., physically coupled or mounted) on an agricultural vehicle 120. A telematics device 130, for example telematics device 130a or 130b, captures, transmits, and processes data directly from the field. In particular, a telematics device 130 communicates data recorded by a single agricultural vehicle 120 to an off-unit storage component, for example an agricultural data store 150 hosted on a cloud server, which stores the data. For example, the telematics device 130a may communicate agricultural data recorded by vehicle 120a to an agricultural data store 150 and the telematics device 130b may access the communicated data from the agricultural data store 150. Telematics devices collect both operational and equipment data. Operational data may include seeding, fertilizer application, spraying, harvesting tillage, input supplies, labor costs, hours, service records, production histories, crop condition, and task management. Equipment data includes measurements of fuel burned, fuel levels, engine rotations per minute (RPM), GPS coordinates, wheel slippage, diagnostic trouble codes, engine hours, ground speed, pressure readings, PTO, working state, and other values. The telematics device 130 may monitor equipment data using data streaming and data mapping with recorded from the field automatically collected as tasks are completed.

As described above, data recorded by agricultural vehicles, for example vehicles 120a or 120b, may record and communicate data to an agricultural data store 150 where the data is stored for a period of time. In some embodiments, if a telematics device 130, for example telematics device 130a, is unable to communicate data to another vehicle, for example via telematics device 130b, the telematics device 130a may instead communicate and store the data at the agricultural data store 150 until such a connection can be established between telematics devices 130a and 130b. In some embodiments, the agricultural data store 150 is hosted on a cloud server.

The off-unit computer 140 is a computing device capable of receiving input with data processing and data communication abilities. Examples of off-unit computers 140 include desktop computers, laptop computers, portable computers, personal digital assistants, smart phones or any other device including computing functionality and data communication capabilities. The off-unit computer 140 allows a human operator to manually review agricultural data recorded by each vehicle 120, to manually adjust operation of each vehicle deployed in a field, or a combination thereof.

Interactions between the agricultural vehicle 120, telematics device 130, agricultural data store 150, and off-unit computer 140 are typically performed via the network 110, which enables communication between the various components of the system. In one embodiment, the network 110 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 110 may also utilize dedicated, custom, or private communication links. The network 110 may comprise any combination of local area and/or wide area networks, using both wired and wireless communication systems.

II. Telematics Device

Figure 2A:
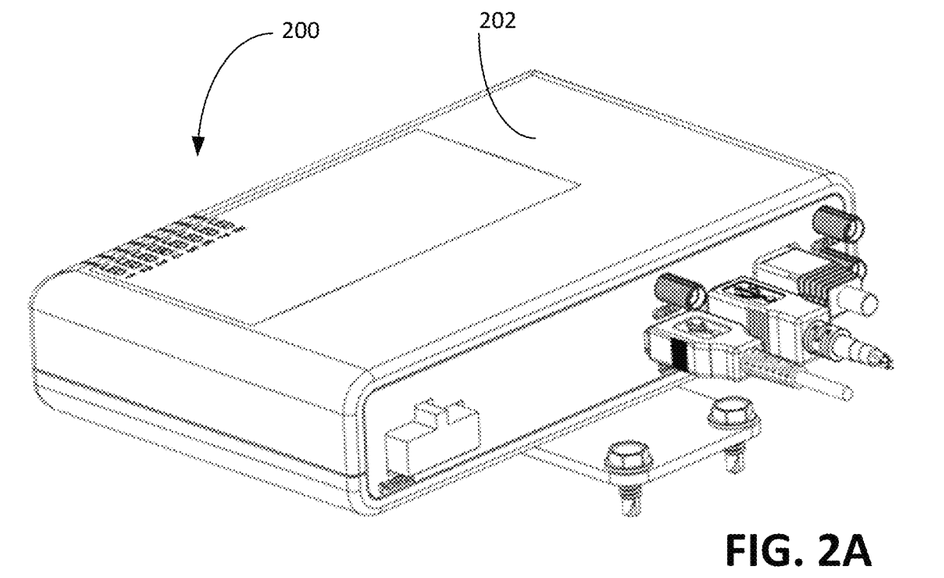
FIG. 2A and FIG. 2B illustrate a telematics device used to acquire data from agricultural vehicles and attached implements, according to an embodiment.
Figure 2B:
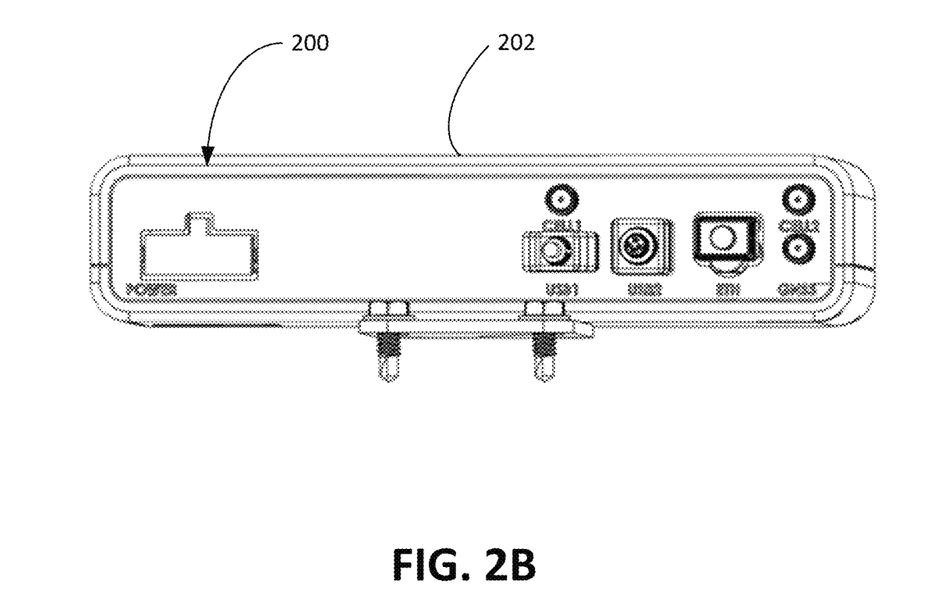

FIGS. 2A and 2B illustrate a telematics device used to acquire data from agricultural vehicles and attached implements, according to an embodiment. The telematics device 200, which may be an embodiment of the telematics devices 130a or 130b, may function as a USB host or a client with the capacity to either send or receive data. When functioning as a host, a second USB may be plugged directly into the device to download data. Alternatively, when functioning as a client, the device is configured to receive data from external controllers to be transferred later over hours during which a vehicle is not deployed to gather agricultural data. The device may communicate or transfer agricultural data recorded while the agricultural vehicle is in motion, or alternatively, when the vehicle is parked, and its battery turned off. The telematics device may receive variable rate prescriptions from the network 110 which allows a new prescription to be requested and received from an operator using an off-site computer 140. The telematics device 200 may include a telematics device housing.

II.A Adjusting Data Transfer Rates

A telematics device, for example the telematics device 200, 130a, or 130b, may by implemented to acquire data from agricultural vehicles and implements attached to each vehicle by adjusting the rate and/or content of live data transfer based on the wireless connectivity of the environment. The telematics device may have a built-in wireless transceiver, a wireless modem or may be connected to a peripheral wireless modem, with the ability to send data to the agricultural data store 150, as well as multiple interfaces. A first interface sends agricultural data recorded by the vehicle to a networked or wirelessly connected interface for storage and a second interface queries the device for specific parameters based on the current connectivity information. In particular, the telematics device determines if a wireless connection is available to the vehicle and telematics device and, if so, a measure of how much wireless connection is available. Based on the level of available connection, the telematics device performs a real-time calculation which optimizes the transfer of data by predicting connectivity values. The real-time calculation may additionally be used to predict the quality of live data transfer in different areas of a field and communicate the results of that calculation to an operator.

As an example, operators of vehicles deployed in an environment with a wireless connection above a threshold level of connectivity (or defined differently, a strong) wireless connection may have live data transferred via the telematics device at the rate at which it is collected by the agricultural vehicle, other communicatively coupled agricultural vehicles, or a combination thereof. In one embodiment, the telematics device may determine that a wireless connection has insufficient bandwidth to transmit live data. Accordingly, the device may communicate an alert, signal, or combination thereof to an operator of the vehicle to manually access and store data recorded by an agricultural vehicle.

In one embodiment, the wireless signal strength may be strong, however, there could be a high number of devices connected to the wireless network, effectively limiting actual bandwidth. There are two variables in this embodiment. One is the signal strength to a tower or Wi-Fi access point, and the second is the actual speed at which data is being successfully uploaded and downloaded.

Alternatively, operators in an environment with a wireless connection below a threshold level of connectivity (or defined different, a weak) wireless connection may reduce the rate of live data transfer by prioritizing certain types of data or data packets to ensure that the most relevant data is transferred first. For example, vehicles deployed in some remote fields or on a hill in a field may experience reduced levels of wireless connectivity, if any connection is available at all. Accordingly, growers with poor wireless connectivity may have the rate and/or content of data transfer adjusted downward to ensure real-time data, with the greatest possible detail, is moved to a cloud server for storage, for example the agricultural data store 150. In such implementations, all data may be transferred via telematics device over a longer duration of time. Alternatively, the data or data packets that were not prioritized are stored on the telematics device or at the agricultural data store 150 until the wireless connectivity improves. In embodiments in which data transfer has fallen behind, once the vehicle encounters improved wireless connectivity, the remaining data is interleaved with the prioritized data. As a result, the data transfer is able to catch up while still sending the prioritized data.

In some embodiments, the telematics device may be unable to transmit live data as fast as it is collected, or as fast as the telematics device is programmed to transmit the live data. As a result, the telematics device 130 transmits all data recorded by an agricultural vehicle 120, but that transfer occurs as connectivity permits. Accordingly, the data may instead be stored on a cloud server, for example the agricultural data store 150, until the telematics device is able to transmit the backlogged data. Larger files are incrementally uploaded in chunks of data, often referred to as "data packets." When a wireless connection is lost during a large file transfer, the upload will resume when a connection becomes available again from the point at which the wireless connection was previously available, rather than starting the upload from the beginning. Given the variability of wireless connectivity in a field, the such an approach aids in the efficiency of data uploads/transfers.

Figure 3:
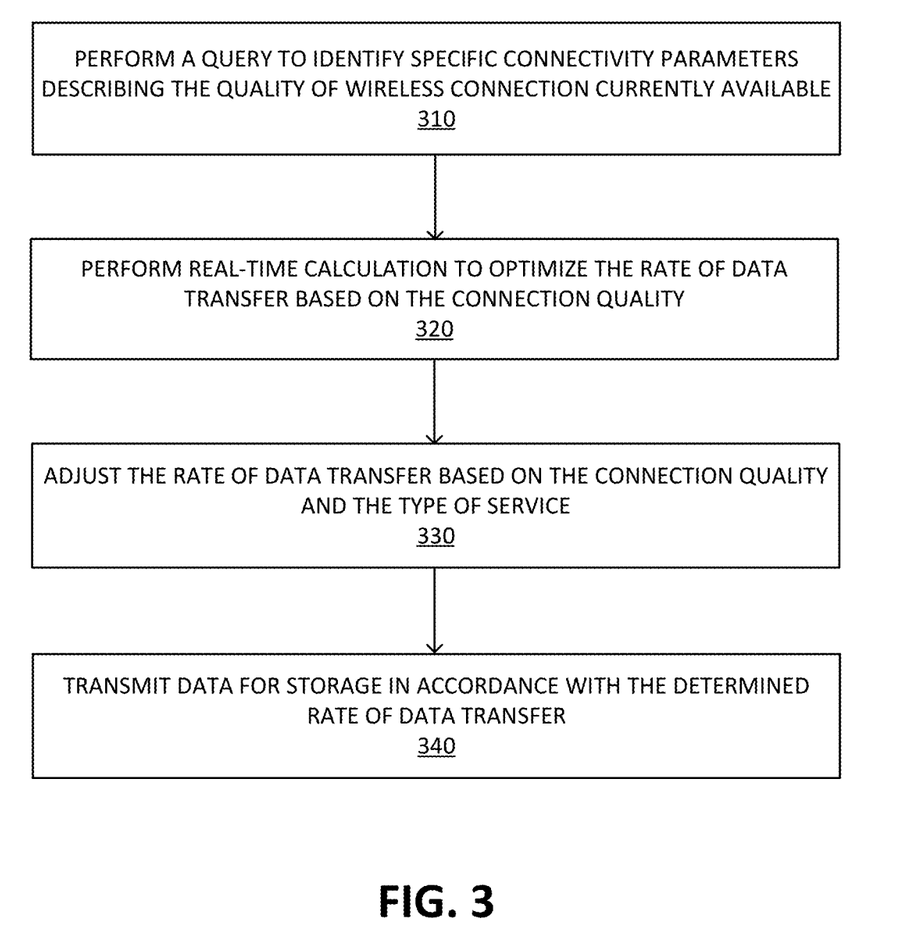
FIG. 3 illustrates a process for adjusting live data transfer using a telematics device, according to an embodiment.

FIG. 3 illustrates a process for adjusting live data transfer using a telematics device, according to an embodiment. The telematics device performs a query 310, via a first interface, to identify specific connectivity parameters describing the quality of wireless connection currently available to an agricultural vehicle. Based on the established connection quality, the telematics device performs 320 real-time calculation to optimize the rate of data transfer based on the connection quality. The telematics device adjusts 330 the rate of data transfer based on the connection quality. Adjustments to the rate of data transfer may include either increasing the rate of data transfer in view of a higher quality wireless connection or decreasing the rate of data transfer in view of a lower quality wireless connection. The telematics device transmits 340 data, via a second interface, to a cloud server for storage in accordance with the determined rate of data transfer. Data may be deleted or overwritten at this step if necessary, to optimize data transfer.

II.B Prioritizing Data for Transfer

In addition to adjusting the rate of data transfer, the telematics device may also improve the quality of service by identifying priority data to be transferred based on both the timeliness and the importance of a particular data transfer. Individual pieces of equipment involved in a farming operation, for example specific agricultural vehicles or implements, provide different value or generate different kinds of information to growers. Therefore, each equipment or vehicle type requisites a customized prioritization of data. Based on the type of service being performed by a vehicle, a telematics device identifies the most important agricultural data required to effectively and accurately perform the service and accesses that data from storage on a cloud server.

Values recorded by an agricultural vehicle for prioritized data describe a quality of service. The quality of service may additionally define how quickly an operator would want a vehicle to receive data. As a result, an estimated time for completion of harvest would utilize equipment profile data collected in the field as harvest occurs. Alternatively, data may need to be sent quickly from a device to assist growers in evaluations, for example real-time decisions regarding management of a field.

For example, given a specific service performed by an agricultural vehicle, the most important agricultural data may be the latitude, longitude, and time associated with an average yield at a particular point in time. The prioritized data may also be determined based on the type of agricultural vehicle, machine, or implement to which the telematics device is physically coupled. For example, when the telematics device is coupled to a combine, prioritized data may include moisture and yield values relative. As another example, when the telematics device is coupled to a harvester, prioritized data may include latitude, longitude, time, and the rate at which a mechanism applies a fluid to an area.

In embodiments in which the telematics device prioritizes data to transmit to the agricultural data store, the device may determine which data to prioritize based on various considerations. The device may select data to be prioritized based on the type of agricultural vehicle on which the telematics device is mounted. For example, a telematics device mounted to a tractor may prioritize data associated with planting a field over other types of agricultural data, whereas as a device mounted to a fertilizer applicator may prioritize plant type data or data describing the area that it navigated through; a combine or harvester may prioritize harvest data over engine data. The telematics device may access a database or lookup table identifying types of data to be prioritized given a type of agricultural vehicle. In alternate embodiments, an operator may manually identify types of data to be prioritized for a given agricultural vehicle or for a given set of environmental conditions. In yet another embodiment, the telematics device may reference a history of data transmission for one or more agricultural vehicles of the same type to identify data prioritized manually by an operator during a previous deployment or season. Based on current wireless signal strength and quality, the telematics device may automatically decide to send harvest or application data as a priority over engine data.

The prioritization of data may be based on temporal considerations, in addition to or instead of the type of service performed by a vehicle. For example, real-time kinematic (RTK) data used to enhance the precision of position data from a satellite-based positioning system is critical for guiding machines through a field. A large gap in time between receiving RTK data packets at a telematics device would be detrimental to farming operations. Accordingly, a telematics device may reference a database, lookup table, or instruction received from an operator indicating that the transfer of RTK data be prioritized over other types of data for any type of agricultural vehicle. Therefore, telematics devices in any agriculture vehicle would give precedence to RTK data over other types of data transfer regardless of the specific service performed by an agricultural vehicle. As another example, some diagnostic trouble codes (DTC) may be benign such as a dirty air filter code. However, other DTC's represent critical machinery issues such as low oil pressure or high machine temperature. Similarly, a telematics device may reference a database, lookup table, or operator-provided instruction to identify individual DTC's to be prioritized over other types of data for a given type of agricultural vehicle. Accordingly, the telematics device assigns specific DTC's a higher quality of service, or a higher prioritization over other types of data.

Compared to related art systems in which data may be prioritized collectively for a fleet of agricultural vehicles, each telematics device mounted to an agricultural vehicle prioritizes data transfer individually for each vehicle of a fleet based on the available wireless connection and the type of service for the vehicle. This is advantageous compared to conventional systems as the telematics device knows, based on the type of data and the type of vehicle, which data type is more important to send.

Figure 4:
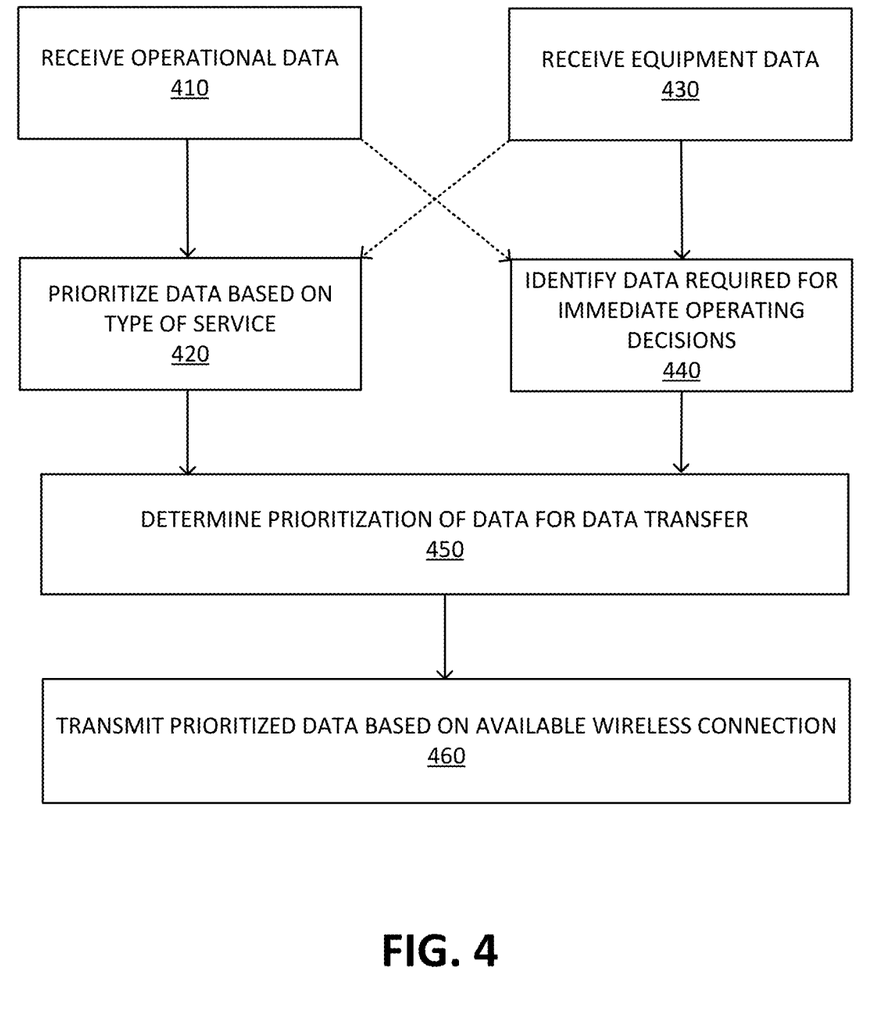
FIG. 4 illustrates a process for determining the quality of service for an agricultural vehicle and attached implements, according to an embodiment.

FIG. 4 illustrates a process for determining the quality of service for an agricultural vehicle and attached implements, according to an embodiment. The telematics device receives 410 operation data describing the task which was performed or is being performed by an agricultural vehicle. Given the operation data, the device determines 420 a prioritization of data based on the type of service. Additionally, the telematics device receives 430 equipment data describing the functionality of the equipment, for example RTK and DTC data. From the equipment data, the device identifies 440 data required for the vehicle or operator to make immediate operating decisions regarding the vehicle. In some implementations, the operation data may also be considered in the identification of data required for immediate operating decisions and equipment data may also be considered in the prioritization of data based on the type of service. Based on both the above considerations, the telematics device 450 determines an aggregate prioritization of data for data transfers occurring in conditions with limited wireless connectivity and transmits 460 the prioritized data based on the available wireless connection. Data may be deleted or overwritten at this step if needed to optimize data transfer.

Figure 7:
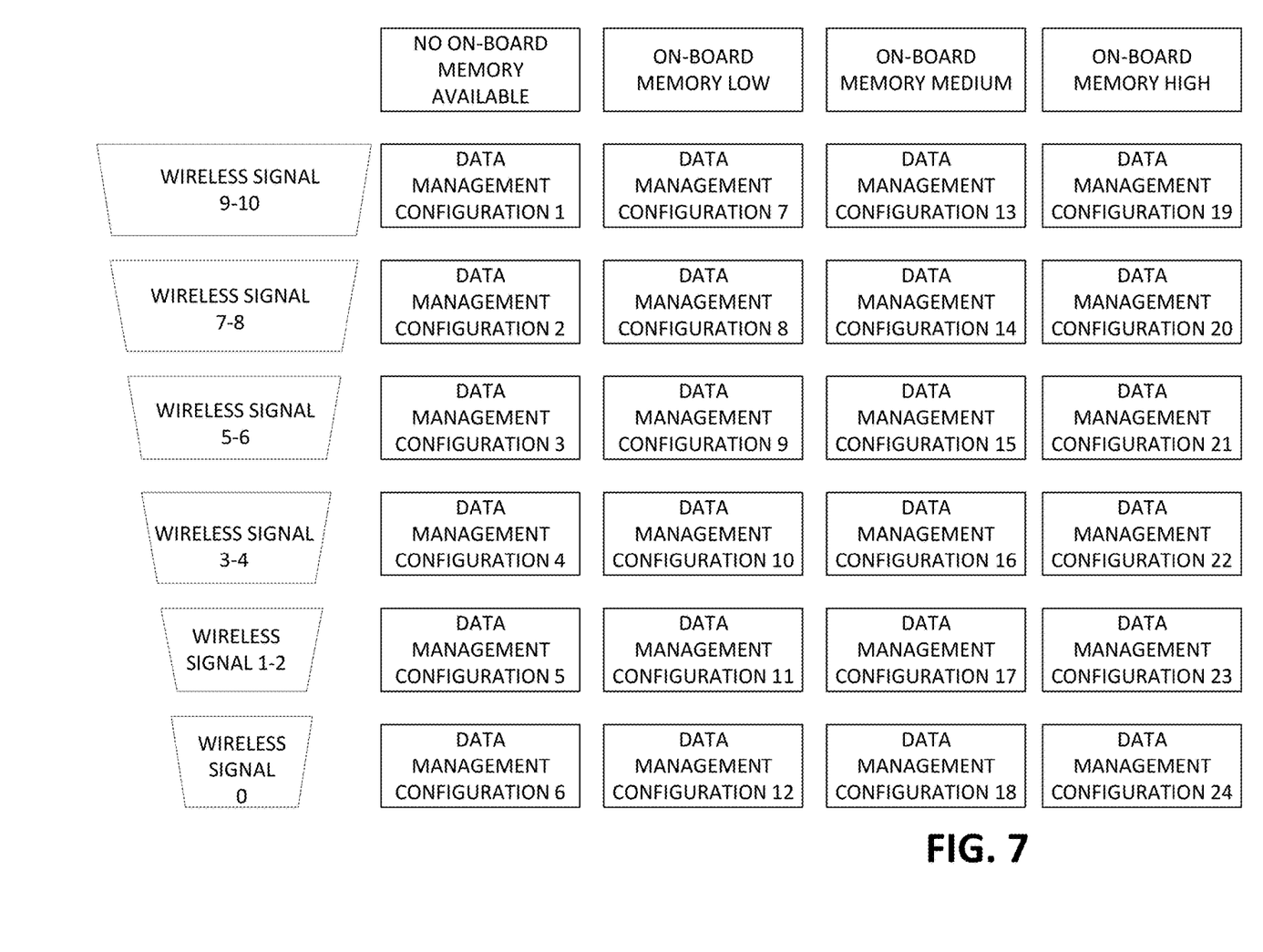
FIG. 7 is an overview of a system for managing the recording, uploading, and downloading of data with the telematics device.

FIG. 7 is an overview of a system for managing the recording, uploading, and downloading of data with the telematics device. Each data management configuration can comprise a customizable set of rules, wherein the telematics device can be instructed to change what it: a) records, b) uploads to a network or device, c) how frequently it uploads data to a network or device, d) what it downloads from a network device, e) how frequently it downloads from a network or device, and f) what data is deleted when a combination of poor wireless signal and low device memory exists. This system allows for accountability for several condition that are simultaneously and dynamically changing. There is no finite number of wireless signal categories or finite number of on-board memory level categories. The system also considers a customizable list or algorithm where a customer, specifically an original equipment manufacturer, may want to have this list customized.

The system may include several variables, the first of which is the type of data being recorded. This may include data type A, data type B, and data type C. The frequency of data recording can vary: 1) only record 1 out of 5 data type A values, 2) only record 1 out of 100 data type B values, 3) record all data type C values, or 4) only record when data type A value changes more than 5% from the previous value of data type A.

Other variables are the data being transmitted and downloaded. Prioritized data may be sent or downloaded first but with no other data, or prioritized data may be sent or downloaded with a subset of other data. The order of data transmitted or downloaded may be first in and then first out, last in and then first out, or with a customized order. Frequency of data transmitted or downloaded may be every second, every five seconds, or every hour.

Data deletion is another variable. A customizable set of parameters can include the following: first in and first out, convert a file into a numerical string by a mathematical algorithm (hash a file) and delete identical files, delete a given date range, and delete low priority data, keeping high priority data. Data may be overwritten when a hash shows identical files, after a given date range, or low priority but not high priority data may be overwritten.

A final variable is that of data being transferred over RS-232, serial, or USB. In one embodiment, if faced with certain wireless signal challenges and/or device memory issues, the device, which may be connected to a, for example, a USB drive, laptop, mobile app, or other serial interface that can save data, would then transmit data overflow to a connected data recorder. Overflow data is that, which could not be saved because of no or low available memory. A data recorder is, for example, a thumb drive, an attached computer, an RS-232 device, a connected mobile device, etc., to be used as an overflow memory device.

II.C Remote Power Management

The telematics device may also enable remote power management of power sources from the agricultural vehicle using either an out-of-band management capability or a timing mechanism. Mobile applications, can in some cases, be considered a telematics device and be utilized in the same capacity. The SMS "wake up" could also be used in a push notification concept tot the mobile app where the mobile app then downloads a data management and transmission configuration file. Power management allows for safeguarding of the vehicle battery, device updates, and prescription transfers out to the device. The vehicle may be outfitted with a power management system to monitor battery voltage on a machine, vehicle, or implement, even when in a low power state. Accordingly, the vehicle can be configured to receive updates even when placed in a mode which does not consume battery.

Structurally, an agriculture vehicle may be outfitted with three power wires: a first wire connected to the ground, a second wire connected to enable constant battery power, and a third wire connected to a keyed power circuit which only has power when the key is turned on. When the key is turned off, thereby halting consumption of the battery, sufficient power remains to monitor incoming wireless data. Such a state is referred to as "hibernation state." As a result, messages, for example text messages, with prescriptive instructions for the vehicle may still be received when the vehicle is in hibernation state. These messages may contain a variety of instructions for the vehicle, for example instructions to enable to the device to receive a remote update and, once updated, return to a hibernation state. Alternatively, the system may implement a timing mechanism to periodically wake the device from the hibernation state at scheduled intervals. Such an implementation may be used to wake the vehicle to measure the voltage on the vehicle's battery.

The agricultural vehicle may implement an out-of-band management strategy in instances in which a wireless connection, for example an internet connection and/or Wi-Fi connection is unavailable. In such instances, the vehicle may instead receive SMS text messages sent to the device using either the internet or via SMS protocol, both of which operate on a separate frequency from an internet or Wi-Fi connection, for example by means of a cellular network. Assuming that the cellular connection is alive, SMS text messages can be sent to the device instructing it to change power states (i.e., from a hibernation state to an active state) or to complete other actions.

Mobile applications, can in some cases, be considered a telematics device and be utilized in the same capacity. The SMS "wake up" could also be used in a push notification concept tot the mobile app where the mobile app then downloads a data management and transmission configuration file.

An agricultural vehicle may be placed into hibernate mode for a period of time, for example several months during the winter when agricultural equipment is not operating. In one embodiment, SMS text messaging can be received when the vehicle is in a low power state and these messages wake the vehicle from its hibernation state, instruct it to complete an action, and return it to the hibernation state. When the SMS text message is received, a new prescription may be downloaded to the device once it has been awakened from its hibernation state which allows it to execute the prescription when the equipment is next deployed in a field of crops. As described herein, a prescription refers to a set of instructions (i.e., a protocol or routine) describing a task for an agricultural vehicle to execute.

In an exemplary embodiment, a combine vehicle is powered using four batteries which together are large enough to start the vehicle. However, combines are only deployed to perform agricultural tasks three to four months out of the year and during the remainder of the year, they remain inactive. This seasonal cycling between a hibernation state and an active state is a technical consideration unique to agricultural vehicles. As a result, batteries are depleted if no power management mechanism is implemented. Other agricultural vehicles may be deployed for a few weeks and then remain inactive for the next ten months.

In some embodiments, when a battery level for a vehicle falls below a threshold level, the vehicle may be turned off completely to prevent further consumption of the battery. A threshold may be determined to set on the battery voltage to aid in power management. Accordingly, in embodiments in which a device is released from a hibernation state with a below threshold battery level, a message may be transmitted to the cloud to alert an operator of the battery level. Subsequently, the vehicle may transition from hibernate state to a deactivated state in which the vehicle is turned completely off and all aspects of battery consumption are ended. In some embodiment, a vehicle in a deactivated state may not be reawakened remotely, but rather must be reawakened manually by an operator.

Figure 5:
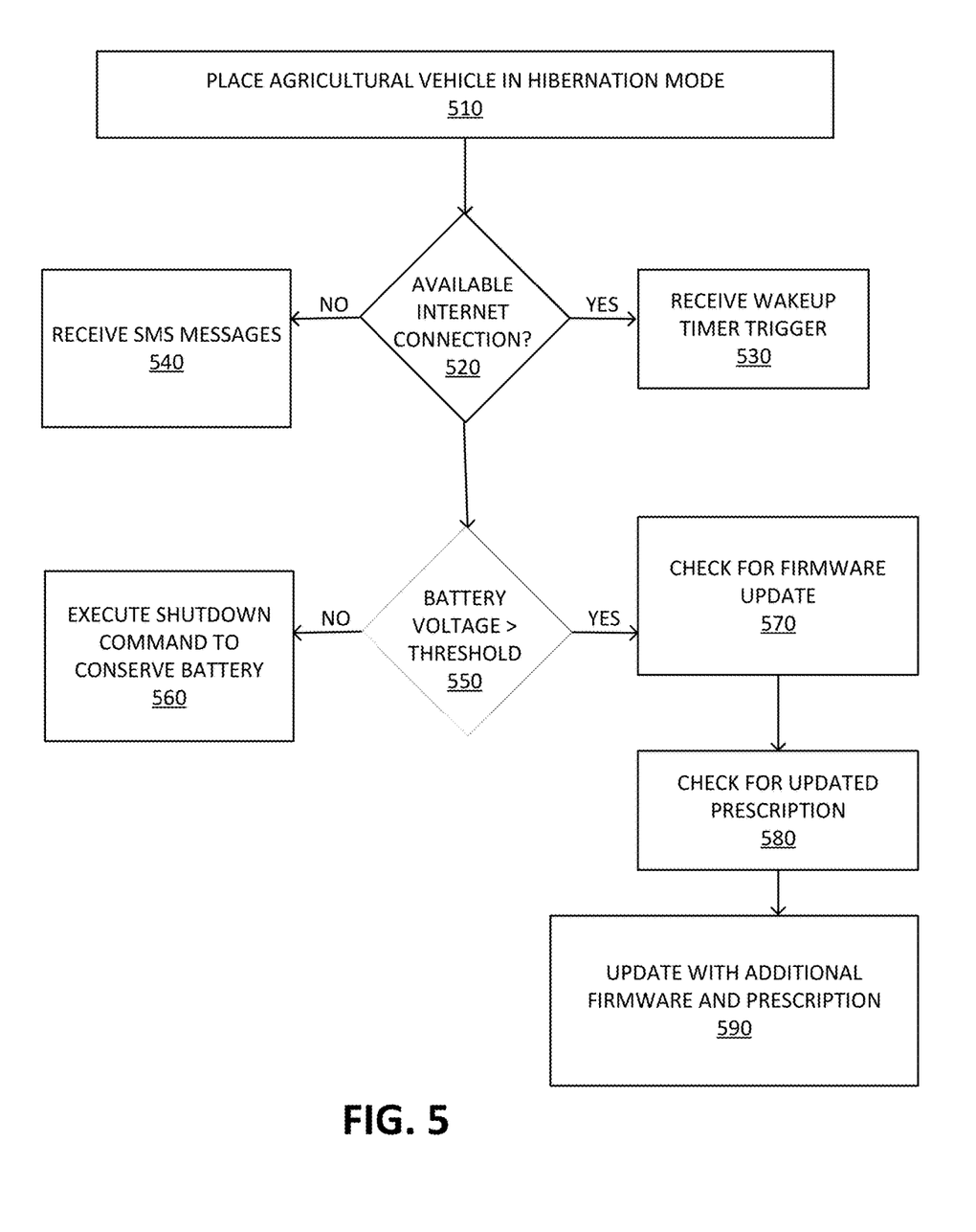
FIG. 5 illustrates a process for power management of an agriculture machine in hibernation mode, according to an embodiment.

In one embodiment, an agricultural vehicle does not awaken from a hibernation state in response to a message, but rather periodically transitions from its hibernation state to its active state (i.e., in response to a heartbeat signal). Once in the active state, the vehicle downloads any prescriptions or updates received since it was last in the active state, before returning to the hibernation sate. SMS messages may override or change the periodicity at which the vehicle transitions from the hibernation state to the awakened state. Examples of periodicity in such an embodiment may range from hours, to days, to weeks, to months. FIG. 5 illustrates a process for power management of an agriculture machine in hibernation mode, according to an embodiment. The agricultural vehicle is placed in hibernation mode 510, for example during a winter off-season. The vehicle checks at step 520 whether an internet connection is available in the environment surrounding the vehicle. If an internet connection is available, the vehicle receives at step 530 a wakeup timer trigger which instructs the vehicle to activate from its hibernation state. If an internet connection is unavailable, the vehicle receives at step 540 an SMS text message instructing the vehicle to activate from its hibernation state. The vehicle measures the battery voltage and compares at step 550 the battery voltage to a threshold voltage. If the measured voltage is below the threshold, the vehicle executes at step 560 a shutdown command to conserve the remaining battery. The measured voltage is above the threshold, the vehicle checks at step 570 for any available firmware updates and checks 580 for an updated prescription. The vehicle updates at step 590 the firmware and prescription information to enable to the vehicle to perform an agricultural task during the vehicle's next deployment.

III. Computing Machine Architecture

Figure 6:
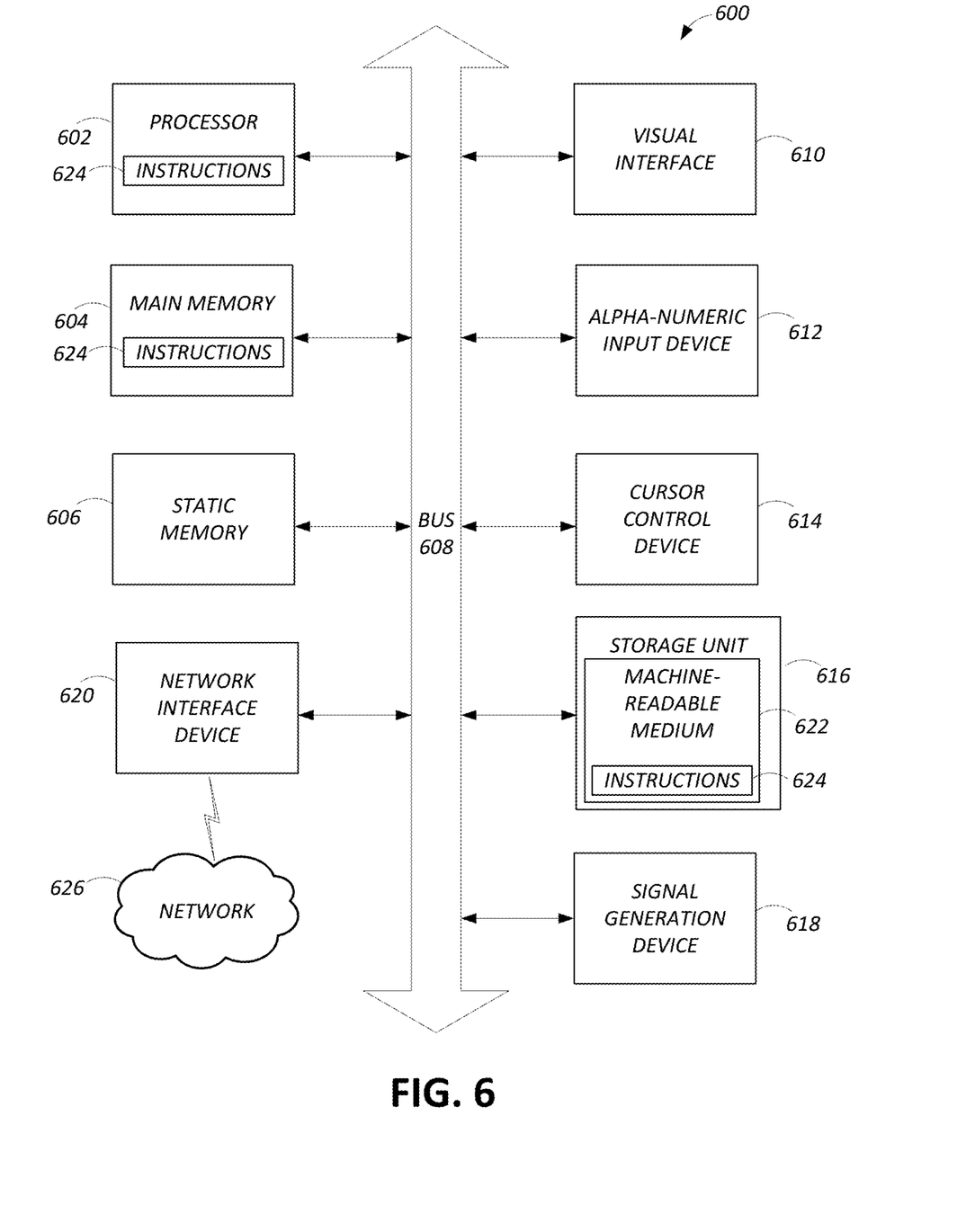
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

VII. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for collecting, transmitting, and collecting data recorded by agricultural vehicles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope of the disclosure.

What is claimed is:

1. A telematics device associated with an agricultural vehicle for communicating and collecting agricultural data, the telematics device comprising:
   a telematic device housing;
   a processor disposed within the telematic device housing, the processor coupled to a wireless transceiver for providing wireless connectivity for communicating the agricultural data;

an interface coupled to the processor for receiving the agricultural data from the agricultural vehicle, or an implement towed by the agricultural vehicle;

wherein the processor is configured to determine a measure of the wireless connectivity associated with the wireless transceiver and adjust a data transfer rate up or down based on the measure of the wireless connectivity by: (i) identifying at least a first type of the agricultural data, (ii) identifying at least a second type of the agricultural data, and (iii) prioritizing the first type of the agricultural data for communication with the wireless transceiver if the measure of the wireless connectivity is below a threshold level of connectivity.

2. The telematics device of claim 1 wherein the measure of the wireless connectivity comprises wireless signal strength and wireless signal quality.

3. The telematics device of claim 1 wherein the telematics device is configured to query a wireless model communicatively coupled to the telematics device for parameters that establish the measure of the wireless connectivity.

4. The telematics device of claim 1 wherein the first type of the agricultural data is associated with a type of the agricultural vehicle, the type of the agricultural vehicle having a quality of service associated therewith in which the quality of service identifies which data should be prioritized for communication.

5. The telematics device of claim 1 wherein the agricultural data includes equipment data and operation data.

6. The telematics device of claim 1 wherein the telematics device has an active state and a hibernating state and wherein the telematics device provides remote activation from the hibernating state to the active state.

7. A telematics device associated with an agricultural vehicle for communicating and collecting agricultural data, the telematics device comprising:
a telematic device housing;
a processor disposed within the telematic device housing, the processor coupled to a wireless transceiver for providing wireless connectivity for communicating the agricultural data;
an interface coupled to the processor for receiving the agricultural data from the agricultural vehicle, or an implement towed by the agricultural vehicle;
wherein the processor is configured to determine a measure of the wireless connectivity associated with the wireless transceiver and adjust a data transfer rate up or down based on the measure of the wireless connectivity;
wherein the telematics device has an active state and a hibernating state;
wherein the telematics device provides remote activation from the hibernating state to the active state; and
wherein the remote activation is provided using an out-of-band management Short Message Service (SMS) message.

8. A telematics device associated with an agricultural vehicle for communicating and collecting agricultural data, the telematics device comprising:
a telematic device housing;
a processor disposed within the telematic device housing, the processor coupled to a wireless transceiver for providing wireless connectivity for communicating the agricultural data;
an interface coupled to the processor for receiving the agricultural data from the agricultural vehicle, or an implement towed by the agricultural vehicle;
wherein the processor is configured to determine a measure of the wireless connectivity associated with the wireless transceiver and adjust a data transfer rate up or down based on the measure of the wireless connectivity;
wherein the telematics device has an active state and a hibernating state;
wherein the telematics device provides remote activation from the hibernating state to the active state; and
wherein the active state allows for updating of at least one of firmware for the telematics device and prescription information.

9. The telematics device of claim 1 wherein the telematics device has an active state and a hibernating state and wherein the telematics device includes a timer configured to periodically transition the telematics device from the hibernating state to the active state.

10. The telematics device of claim 1 wherein the processor provides for data management to determine recording of data, uploading of data to a network or device, frequency of uploading of data to the network or device, frequency of downloading of data from the network or device, and deletion of data based on the measure of the wireless connectivity and amount of available memory storage.

11. A method performed with a telematics device associated with an agricultural vehicle for communicating and collective agricultural data comprising equipment data and operation data, the telematics device including (i) a telematic device housing, (ii) a processor disposed within the telematic device housing in which the processor is coupled to a wireless transceiver for providing wireless connectivity for communicating the agricultural data, and (iii) an interface coupled to the processor for receiving the agricultural data from the agricultural vehicle or an implement towed by the agricultural vehicle, the method comprising:
receiving, using the processor, the agricultural data from the agricultural vehicle or the implement towed by the agricultural vehicle;
determining, using the processor, the measure of the wireless connectivity associated with the wireless transceiver;
adjusting, using the processor, the data transfer rate up or down based on the measure of the wireless connectivity by: (i) identifying at least a first type of the agricultural data, (ii) identifying at least a second type of the agricultural data, and (iii) prioritizing the first type of the agricultural data for communication with the wireless transceiver if the measure of the wireless connectivity is below a threshold level of connectivity.

12. The method of claim 11 wherein the first type of the agricultural data is associated with a type of the agricultural vehicle, the type of the agricultural vehicle having a quality of service associated therewith in which the quality of service identifies which data should be prioritized for communication.

13. A telematics device associated with an agricultural vehicle for communicating and collecting agricultural data, the telematics device comprising:
a telematic device housing;
a processor disposed within the telematic device housing, the processor coupled to a wireless transceiver for providing wireless connectivity for communicating the agricultural data;
an interface coupled to the processor for receiving the agricultural data from the agricultural vehicle, or an implement towed by the agricultural vehicle;

a memory operatively connected to the processor for storing the agricultural data from the agricultural vehicle or the implement towed by the agricultural vehicle;

wherein the processor provides for data management to determine recording of the agricultural data to the memory, uploading of the agricultural data to a network or device, frequency of uploading of the agricultural data to the network or device, frequency of downloading of data from the network or device, and deletion of data based on a measure of wireless connectivity and an amount of available memory storage.

14. The telematics device of claim 13 wherein the agricultural data includes equipment data and operation data.

15. The telematics device of claim 13 wherein the telematics device has an active state and a hibernating state and wherein the telematics device provides remote activation from the hibernating state to the active state.

16. The telematics device of claim 15 wherein the remote activation is provided using an out-of-band management Short Message Service (SMS) message.

17. The telematics device of claim 16 wherein the active state allows for updating of at least one of firmware for the telematics device and prescription information.

18. The telematics device of claim 13 wherein the telematics device has an active state and a hibernating state and wherein the telematics device includes a timer configured to periodically transition the telematics device from the hibernating state to the active state.

* * * * *